(12) United States Patent
Nilsen et al.

(10) Patent No.: US 6,888,928 B1
(45) Date of Patent: May 3, 2005

(54) ARRANGEMENT IN CONNECTION WITH SUPPLEMENTARY SERVICES PROVIDED BY DIFFERENT VENDORS

(75) Inventors: Børge Nilsen, Oslo (NO); Jan Holm, Uppsala (SE); Johan Philip Steller, Slependen (NO); Richard Michael Collin, Swansea (GB)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/521,469

(22) Filed: Mar. 8, 2000

(30) Foreign Application Priority Data

Mar. 10, 1999 (NO) .......................... 19991170
Mar. 19, 1999 (NO) .......................... 19991343

(51) Int. Cl.⁷ ............................. H04M 11/08
(52) U.S. Cl. ................. 379/88.13; 379/88.16; 379/88.18
(58) Field of Search .............. 705/26, 27; 379/88.13, 379/88.14, 88.16, 88.18, 201.01, 229; 370/352

(56) References Cited

U.S. PATENT DOCUMENTS

| | | | | |
|---|---|---|---|---|
| 5,867,495 A | * | 2/1999 | Elliott et al. ................ | 370/352 |
| 5,940,834 A | * | 8/1999 | Pinard et al. ................ | 707/102 |
| 6,047,053 A | * | 4/2000 | Miner et al. ................ | 379/201.01 |
| 6,167,395 A | * | 12/2000 | Beck et al. ................ | 707/3 |
| 6,188,683 B1 | * | 2/2001 | Lang et al. ................ | 379/229 |
| 6,208,642 B1 | * | 3/2001 | Balachandran et al. ..... | 379/229 |
| 6,226,678 B1 | * | 5/2001 | Mattaway et al. .......... | 709/230 |
| 6,323,894 B1 | * | 11/2001 | Katz ........................... | 705/27 |
| 6,363,411 B1 | * | 3/2002 | Dugan et al. ........... | 379/201.01 |
| 6,377,664 B2 | * | 4/2002 | Gerszberg et al. ....... | 379/88.13 |
| 6,430,174 B1 | * | 8/2002 | Jennings et al. ......... | 379/88.13 |
| 6,438,217 B1 | * | 8/2002 | Huna ....................... | 379/88.14 |
| 6,466,653 B1 | * | 10/2002 | Hamrick et al. ......... | 379/88.16 |

FOREIGN PATENT DOCUMENTS

| | | |
|---|---|---|
| SE | 9 603 265 | 3/1998 |
| WO | WO 97/23988 | 7/1997 |
| WO | WO 98/16051 | 4/1998 |

OTHER PUBLICATIONS

Jim Whitehead, "A Brief Introduction to WEBDAV", Sep. 18, 1998, pp. 1–2, Department of Information and Computer Science, University of California, Irvine, Irvine, CA.

* cited by examiner

*Primary Examiner*—Robert P. Olszewski
*Assistant Examiner*—Bryan Jaketic

(57) ABSTRACT

The present invention relates to an arrangement in connection with supplementary services provided by different vendors, especially the interaction thereof, which supplementary services comprise appropriate standards and protocols, and for the purpose of giving the user a larger ability to influence the supplementary services in question, as well as improving the possibility for vendors to arrive at general standards which are more easy to interpret and which will reduce or eliminate the need of long interoperability tests, it is according to the present invention suggested to use Java as a new media channel, meaning that the arrangement further comprises means for the user to publish service information, advertisements and options to the remote user.

29 Claims, 2 Drawing Sheets shows the terminal architecture.

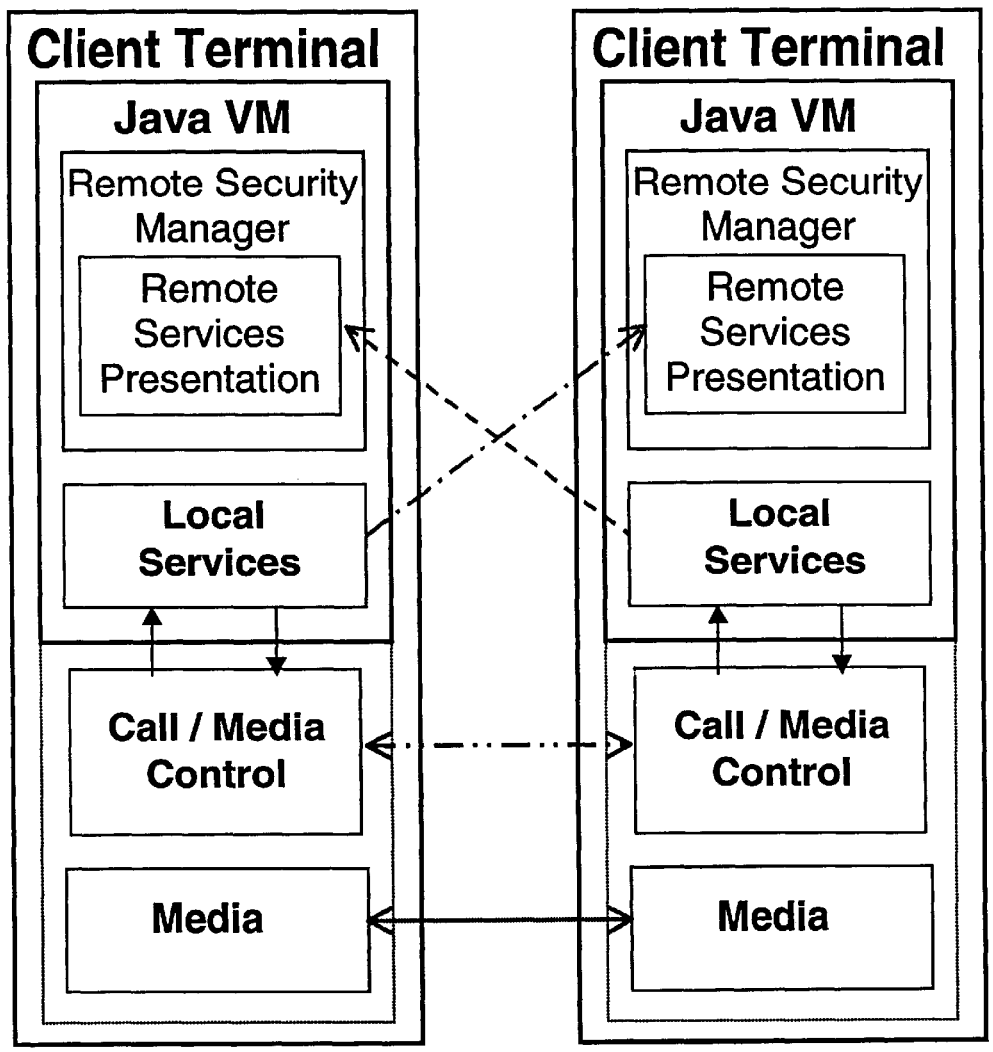
Figure 1 shows the terminal architecture.

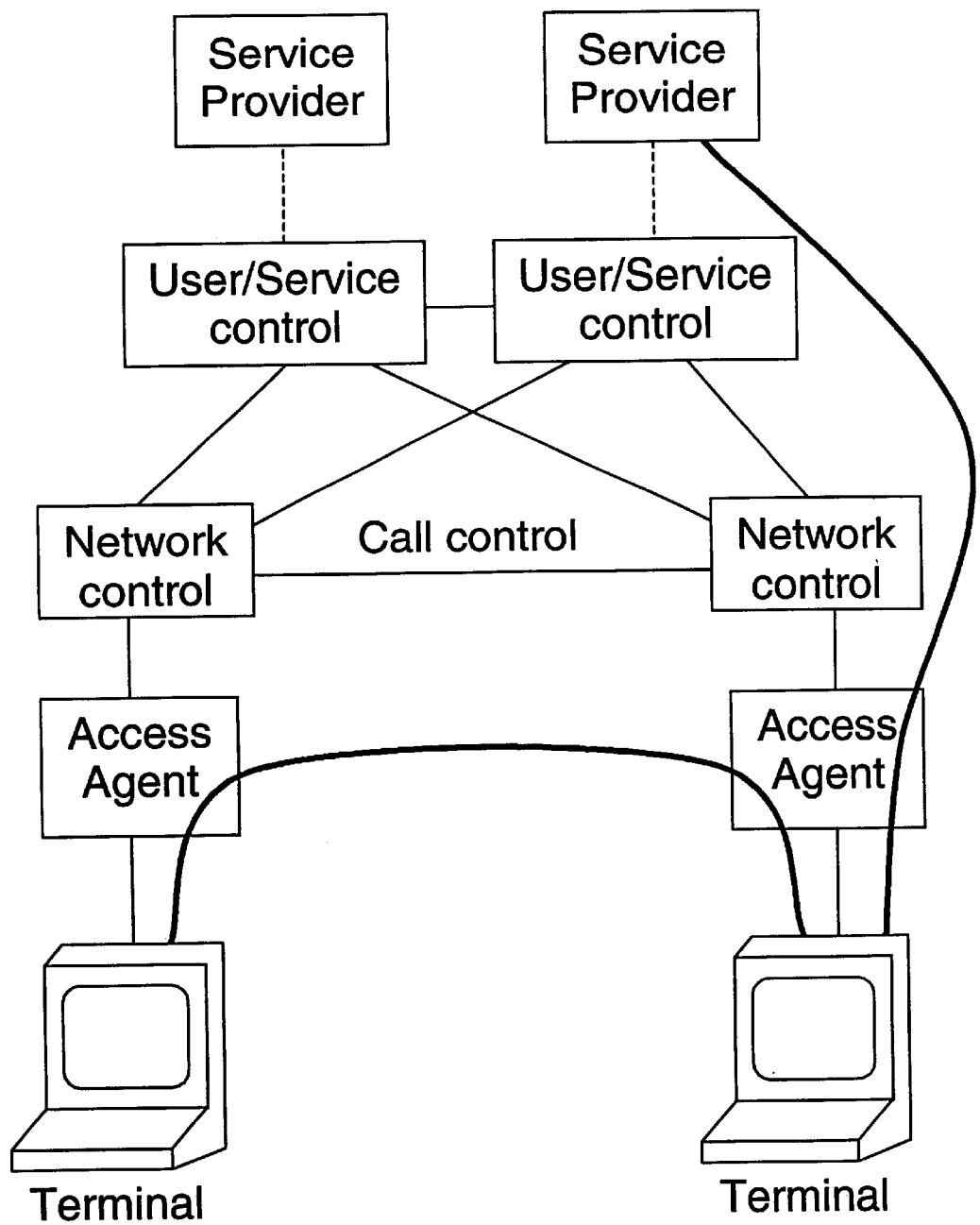
Figure 2 shows two possible media channel configurations in the IP network for Remote Service Publishing.

ARRANGEMENT IN CONNECTION WITH SUPPLEMENTARY SERVICES PROVIDED BY DIFFERENT VENDORS

FIELD OF THE INVENTION

The present invention relates to an arrangement in connection with supplementary services provided by different vendors, especially the interaction thereof, which supplementary services comprise appropriate standards and protocols.

BACKGROUND OF THE INVENTION

Supplementary service interactions are difficult to resolve without input from the users. For example, if somebody calls a person with the "Call Forwarding on Busy" service and the "Call Waiting", how does the originator have any influence over the decision of what service is invoked?

Vendor Service Interoperability

Supplementary services developed by different vedors often interact badly unless strict standards are built.

STATE OF ART

Default Service Interaction

This is currently handled by using hard coded decisions to try to guess what the user would expect. Usually, one supplementary service has priority and is invoked regardless of what the users expect.

Vendor Service Interoperability

Specifying strict standards on interaction using lengthy protocol and scenario descriptions currently solves this problem.

Further Prior Art

From CA 2 187 240 (WO98/16051) (Metell Corporation) there are previously known downloadable applications for network control of telephone links, comprising web server downloading applets to user with applets interacting with server to control telephone link services. This prior art system provides smaller users with a user-friendly interface for utilising a range of telephone system features.

From SE 9606265 (Telia AB) there is known a telecommunication network incorporating subscriber equipment enabling a subscriber to be provided with telecommunication services from a network via operator and having one or more units with control logic and control function. This prior art system permits quicker and simpler alteration of control logic and more intelligent control logic in use of telecommunication services.

PROBLEMS WITH PRIOR ART

Default Interaction

Users are often confused by the result of these hard coded decisions and would prefer that they could influence the decision. E.g. some users do not wish to leave voice mail messages so they would prefer to be told that the person they have called is currently busy, rather than being directly forwarded to a voice mail machine.

Vendor Service Interoperability

To describe all the scenarios and all the protocol messages, get all vendors to agree on the descriptions and publish these descriptions, is a very lengthy and costly process. These standards are always a compromise and can still be open to interpretation creating an extra cost, as long interoperability tests have to be performed.

OBJECTS OF THE INVENTION

An object of the present invention is to provide an arrrangement which can give the user a larger ability to influence the supplementary services in question.

A further object of the present invention is to provide an arrangement giving an improvement of the possibility for the vendors to arrive at general standards which are more easy to interpret, and which will reduce or eliminate the need of long interoperability tests.

BRIEF SUMMARY OF THE INVENTION

The above objects are achieved in an arrangement as stated in the preamble, which according to the present invention is characterised in that the arrangement further comprises means for the user to publish service information to the remote user.

However, it should be understood that such service control is not limited to service control between peer entities in a call, i.e. between caller and callee, but can also be used in connection with service control from any third party (e.g. ISP) or any other service provider.

This could be used for giving access to personal profiles and for pushing out commercial data.

More specifically it is suggested that said publishing means comprise technology which can be implemented in an appropriate virtual machine, especially Java technology being implemented in a Java Virtual Machine (JVM).

Further features and advantages of the present invention will appear from the following description taken in conjunction with the enclosed drawings, as well as from the appending patent claims.

BRIEF DISCLOSURE OF THE DRAWINGS

FIG. 1 is a block diagram illustrating a terminal architecture wherein an arrangement according to the present invention can be implemented.

FIG. 2 is a schematical block diagram illustrating two possible media channel configuration in the IP network for Remote Service Publishing, the actual media protocols within the media channel being illustrated in FIG. 1.

DETAILED DESCRIPTION OF EMBODIMENTS

As mentioned previously the present invention suggests an arrangement whereby the previous problems with prior art can be resolved in a far more expedient and rational manner.

In brief, the solution to said problems is for a provider to publish service information and options to the remote user.

This can be easily achieved by using Java™ technology, assuming that both user terminals have a Java virtual Machine (JVM) approved by Sun™ Microsystems. With the advent of Internet telephony, these call cases will become very common in the near future. The H.323 IP telephony standard specifies many types of voice media, and this solution suggests that in addition to these voice medias a new media type, Java, is defined.

Most IP telephony standards allow multiple media channels between users, and this solution requires two full duplex media channels for the Java, as well as a media channel for any other media that is being sent between the users, e.g. voice. The Java media channels should be negotiated as soon as the call set-up has reached the terminating user's terminal.

FIG. 1 is a schematical diagram illustrating a terminal architecture that enables the above solution, the terminal architecture here being a preferred embodiment whereby the arrangement according to the present invention can be implemented.

The Java RMI communication channels are only standardised as far as the Java RMI standard specified by Sun™ Microsystems. This allows the local services to present themselves to the remote user in any way they like as long as the do not break the security manager's rules. Each clients terminal provides an area on the screen for the remote services to be presented.

This area equates to a specified Java component known as a Panel. As long as the remote service presentation "inherits" from this Java component, it can display itself in any way it wants to, given the restraints of the panel, e.g. the panel size.

Once the Java RMI media channels have been negotiated, each terminal requests from the remote terminal, using the Java RMI protocol, the Java Panel to be displayed. The remote presentation is downloaded automatically to the terminal, after which the terminal asks the panel to display itself. This remote presentation is controlled from the remote side and can be changing for the entire duration of the call.

The panel accepts events from the user, e.g. mouse clicks, and can either react locally or send messages back to the system it was downloaded from to request, for example, an invocation of a service.

FIG. 2 shows two possible media channel configurations in the IP network for Remote Service Publishing. The actual media protocols within the media channel is shown in FIG. 1.

Merits of Invention

Default Service Interaction

With the new solution, default service interaction solutions are only required if the user is unable to decide what should happen. This means that the user can be told about the decisions that can be made at any point in the call and also be informed about the default decision if they take no action. What is more, the call and media control protocols remain unaffected, as all this remote service presentation negotiation is implemented using other protocols.

Vendor Service Interoperability

The new solution allows vendors to produce completely proprietary remote presentations as long as they use a Java Panel as the base for the presentation. No standardisation of the service presentation protocols is required as only one vendor needs to understand the application protocol on top of RMI as the vendor's code is running both on the local and remote machine. This means that no interoperability tests have to be performed between vendors for the presentation and invocation of their services to the remote party. The only possible standardisation that may be required is a style guide on how to present this information to the user; e.g. button sizes and positions.

Special Features of the Present Invention

Advertising

As the Java Panel can be used to display anything, the space could be used to send advertisements to the called party or even pictures of the caller.

Further, it is to be understood that advertising can be provided by an independent third party or by a service provider.

Service Distribution

The local services on the terminal could also be implemented in Java as well. This would enable downloading of user services to his terminal when he logged in. Other technologies, such as Casternet™, could be used to provide catching of services to decrease download times although this should not be a problem as Java bytecode is extremely compact. Downloading at login allows an operator to run services at the terminals and keep them up to date automatically.

Simple Service Implementation

Some services could be implemented very simply using this architecture. For example:

A person, Bill, calls another person, John, and John is busy. John presents his options to Bill by instructing his remote panel to display the following buttons:

1) Alert me anyway (Call waiting or intrusion)

2) Leave a voice message (Voice mail)

3) Speak to me on my mobile (Call forward on busy)

Bill sees the options and presses button two. The remote panel reacts locally to the mouse event and displays a dialogue to Bill informing him that recording is taking place. The remote panel records from the microphone until Bill presses a stop button that the panel is displaying. When Bill presses the stop button, the remote panel plays back the message to Bill and asks him if it is OK. Bill clicks the yes button and the remote panel sends the recording as a voice sample attachement to an e-mail to John's mailbox.

This is a simple example of a voice mail service being implemented completely in the terminals and demonstrates how easy it is.

Service Provider Interface

In cases where the user has a subscription with a service provider, this service provider can display user- and service data on the terminal during the service session, i.e. when the user makes a login to the service provider domain. This will allow the end-user to access his/her service profile to e.g. configure service data, such as screening lists or to read service history data, such as lost calls.

ABBREVIATIONS

Java A programming language, normally interpreted
JVM Java Virtual Machine
H.323 standard Protocol describing multimedia control over IP
IP Internet Protocol
Java RMI Java Remote Module Interface
Java VM Java Virtual Machine
RSP Remote Switching Publishing
ISP Internet Service Provider

What is claimed is:

1. An arrangement in a telecommunication network for offering supplementary services to a first party calling a second party, the first party and the second party communicating over a communication channel, the arrangement comprising:

a first client terminal comprising a first virtual machine, the first client terminal being used by the first party;

a second client terminal comprising a second virtual machine, the second client terminal being used by the second party;

wherein the first virtual machine and the second virtual machine are adapted to establish a plurality of media channels between the first client terminal and the second client terminal via the communication channel;

wherein the second virtual machine is adapted to dynamically publish service information and service options to the first client terminal;

wherein the first virtual machine is adapted to dynamically download a service presentation from the second client terminal and implement the service options without understanding an application protocol used by the second virtual machine relative to the dynamic publishing.

2. The arrangement of claim 1, wherein the second virtual machine comprises means for publishing advertisements to the called party.

3. The arrangement of claim 1, wherein the second virtual machine is adapted to be invoked via Internet telephony.

4. The arrangement of claim 1, wherein at least one of the plurality of media channels between the first party and the second party is a voice channel.

5. The arrangement of claim 1, wherein the plurality of media channels are arranged so as to be negotiated as soon as call set-up has reached the second client terminal.

6. The arrangement of claim 1, wherein the second virtual machine comprises means for allowing local services associated with the second party to present themselves in a secure manner to the first party as remote services, the first client terminal providing an area on a screen for the remote services to be implemented.

7. The arrangement of claim 1, wherein the second virtual machine further comprises means for providing default service interaction solutions.

8. The arrangement of claim 1, wherein the publication of service information is implemented independently of call and media protocols that are used.

9. The arrangement of claim 1, wherein the arrangement further comprises:
means for downloading local services to the first client terminal upon login; and
wherein the means for downloading local services allows a provider to automatically update services at the first client terminal.

10. The arrangement of claim 1, wherein the service options are selected from a group consisting of alerting the second party, leaving a voice message for the second party, and forwarding the call to a mobile terminal associated with the second party.

11. The arrangement of claim 1, the arrangement further comprising:
means for playback of a voice message; and
means for attaching the voice message to an e-mail directed to a mailbox associated with the second party.

12. A system for providing supplementary services in a communication network, the system comprising:
a first client terminal associated with a first party, the first client terminal being adapted to initiate a call to a second party;
a second client terminal associated with the second party, the second client terminal being adapted to receive the call from the first client terminal and transmit a service presentation to the first client terminal in response to the call;
wherein the first client terminal further is adapted to receive the service presentation and implement at least one service option indicated by the service presentation in a virtual machine without understanding an application protocol used by the second client terminal relative to the service presentation.

13. The system of claim 12, wherein the second client terminal comprises a remote terminal.

14. The system of claim 12, wherein the at least one service option comprises a voice mail service.

15. The system of claim 12, wherein the at least one service option is selected from a group consisting of alerting the second party, leaving a voice message for the second party, and forwarding the call to a mobile terminal associated with the second party.

16. A method for providing supplementary services in a communication system, the method comprising:
initiating a call from a first client terminal associated with a first party to a second client terminal associated with a second party;
receiving the call at the second client terminal;
transmitting, by the second client terminal, of a service presentation to the first client terminal in response to the call;
receiving the service presentation at the first client terminal;
implementing at least one service option indicated by the service presentation in a virtual machine; and
wherein the virtual machine need not understand an application protocol used by the second client terminal relative to the service presentation.

17. The method of claim 16, further comprising sending advertisements to the second client terminal.

18. The method of claim 17, wherein the advertisements are provided by at least one of a third party and a service provider.

19. The method of claim 16, further comprising downloading local services to the first client terminal upon login.

20. The method of claim 16, further comprising presenting the at least one service option to the first party.

21. The method of claim 20, further comprising performing at least one action associated with the at least one service option upon selection of the at least one service option by the first party.

22. An apparatus for providing supplementary services in a communication system, the apparatus comprising a communication terminal adapted to initiate a call to a remote terminal, download a service presentation from the remote terminal, and implement, in a virtual machine, at least one service option indicated by the service presentation without understanding an application protocol used by the remote terminal relative to the service presentation.

23. The apparatus of claim 22, wherein the at least one service option is selected from a group consisting of alerting a called party associated with the remote terminal, leaving a voice message for the called party, and forwarding the call to a mobile terminal associated with the remote terminal.

24. The apparatus of claim 22, wherein the communication terminal comprises a display adapted to present the at least one service option to a user of the communication terminal.

25. The apparatus of claim 22, wherein the communication terminal is further adapted to perform at least one action associated with the at least one service option upon selection of the at least one service option by a user.

26. The apparatus of claim 22, wherein the communication terminal is further adapted to download local services to the communication terminal upon login by a user.

27. An apparatus for providing supplementary services in a communication system, the apparatus comprising:
a communication terminal adapted to receive a call from a calling terminal and send a service presentation to the calling terminal in response to the call; and
wherein the calling terminal is adapted to implement at least one service option indicated by the service presentation in a virtual machine without understanding an application protocol used by the communication terminal relative to the service presentation.

28. The apparatus of claim 27, wherein the communication terminal is further adapted to perform at least one action associated with the at least one service option upon selection of the at least one service option by a user of the calling terminal.

29. The apparatus of claim 28, wherein the at least one service option comprises a voice mail service.

* * * * *